UNITED STATES PATENT OFFICE.

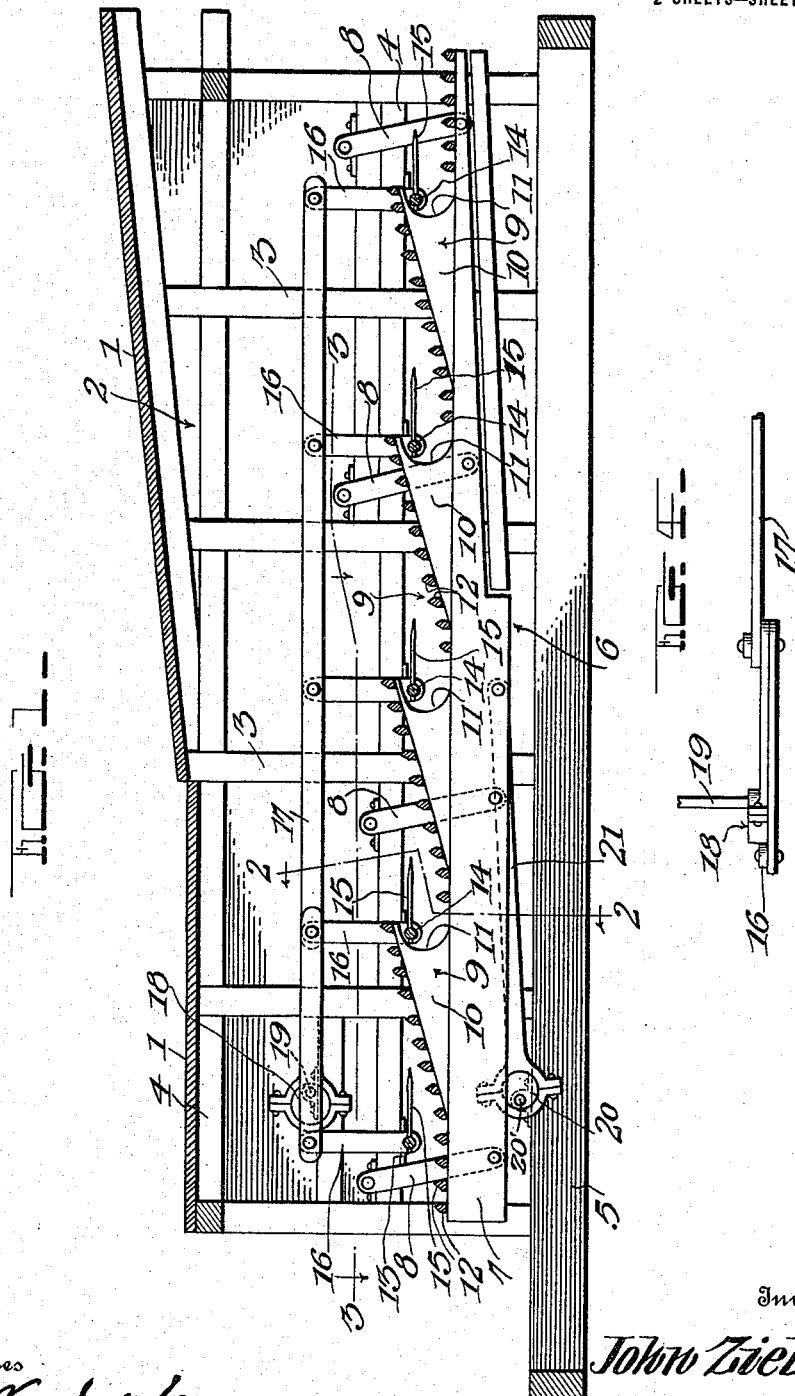

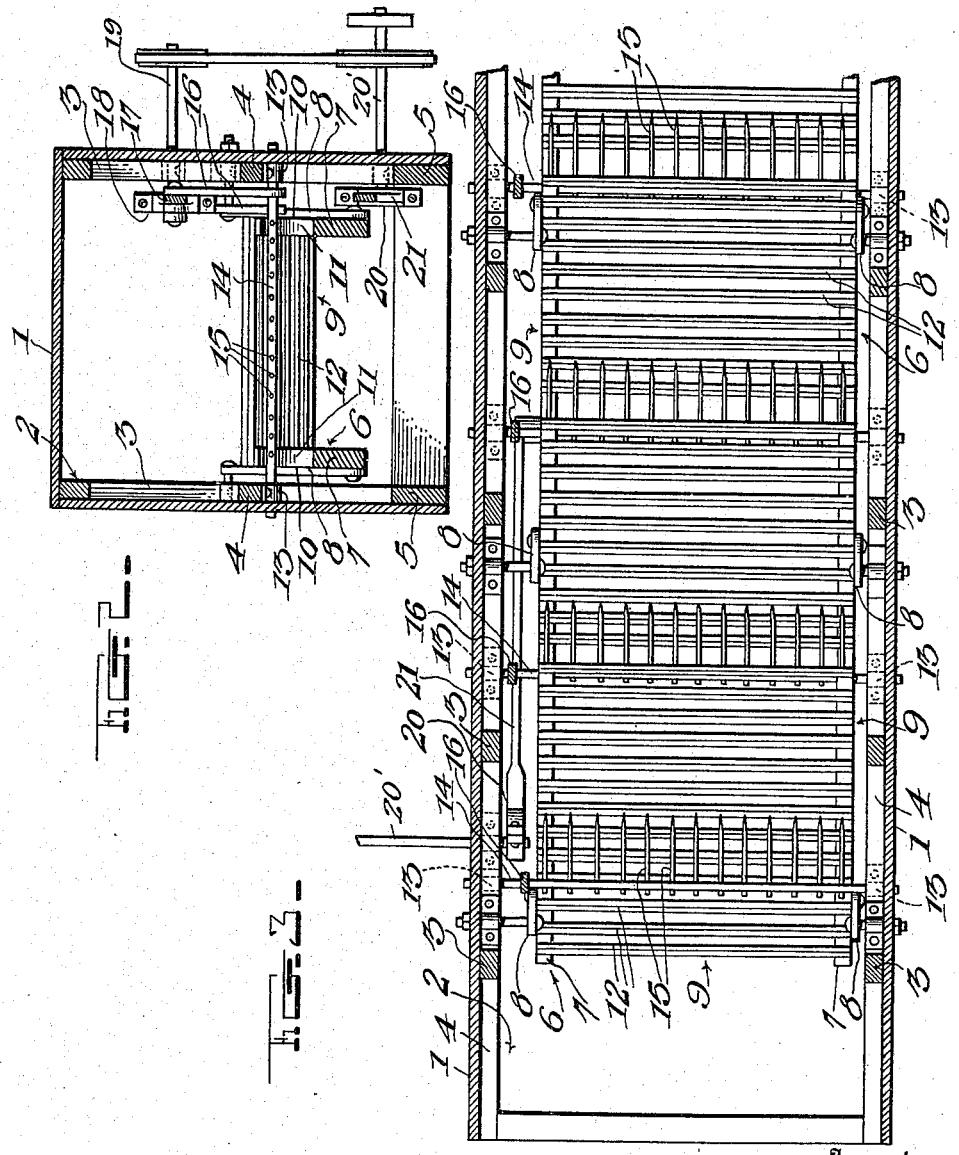

JOHN ZIEBER, OF DRUMMOND, OKLAHOMA.

STRAW AND GRAIN SEPARATOR.

1,147,911. Specification of Letters Patent. Patented July 27, 1915.

Application filed September 10, 1914. Serial No. 861,087.

*To all whom it may concern:*

Be it known that I, JOHN ZIEBER, a citizen of the United States, residing at Drummond, in the county of Garfield and State of Oklahoma, have invented certain new and useful Improvements in Straw and Grain Separators; and I do declare the following to be a full, clear, and exact description of the invention, such as will enable others skilled in the art to which it appertains to make and use the same.

This invention relates to improvements in machines for separating straw from grain after the same has been acted upon by the beaters in a threshing machine.

The primary object of the invention is to provide in connection with a shaking frame having a number of transverse inclined sections, a number of shaking fingers located between the various inclined sections.

In carrying out the above end, the secondary object of the invention becomes to provide means whereby the shaking fingers may be operated at a speed considerably greater than the speed with which the shaking frame is reciprocated.

A still further object is to construct the entire device in the most simple manner consistent with its proper operation.

With these objects in view the invention resides in certain novel features of construction, and combination herein described and claimed and shown in the drawings wherein:—

Figure 1 is a vertical longitudinal section through a portion of a threshing machine showing the application of my invention thereto: Fig. 2 is a transverse section taken on the plane of the line 2—2 of Fig. 1: Fig. 3 is a horizontal section taken on the plane of the line 3—3 of Fig. 1: Fig. 4 is a detail plan view.

In the accompanying drawings I have shown portions of a threshing machine which comprises a suitable casing 1 which is secured to the outer side of a supporting frame 2, the latter comprising a number of upright bars or posts 3 and longitudinal bars 4, said bars 3 rising from longitudinal sills 5 as is common with devices of this character.

Mounted for reciprocation within the frame 2, which includes two side members of the construction above set forth, is a straw shaking rack or frame 6 which is herein shown as comprising longitudinal side bars 7 which are supported upon links 8 pivotally connected thereto and to certain of the longitudinal bars 4. Disposed transversely upon the side bars 7 are a number of inclined shaking sections 9 each of which includes opposite end walls 10 which are here shown of triangular formation having their altitudes notched at 11 and transverse slats 12 which are secured to the upper edges of said end walls at their opposite ends. It will thus be seen that, as straw is deposited upon the various sections 9 and the entire shaking frame reciprocated, said straw will be violently shaken. It will also be noted that the spaces between the upper edges of the sections 9 and the adjacent lower edges of the adjoining sections constitute shoulders which retard the movement of the straw in one direction thereby causing the shaking frame to feed the straw toward the right, in Fig. 1, while the grain is allowed to pass through the spaces between the various slats 12 to be deposited upon a suitable receiving pan (not shown).

It is a well known fact that, in traveling from one end of the shaking frame to the other, an appreciable amount of straw often becomes lodged between the upper and lower edges of adjacent sections 9 and that although this straw is shaken as forcibly as that traveling over said sections 9, the grain cannot be easily removed therefrom on account of the fact that the lodged straw is forcibly compressed. It is also a well known fact that it is practically impossible, with the present day methods, to prevent some of the straw falling through the spaces between the upper and lower ends of adjacent sections onto the grain pan. It is to overcome these two most objectionable features of the shaking frame, so far described, that I have provided the devices now to be described and constituting the gist of the present invention.

Mounted in suitable bearings 13 carried by certain of the longitudinal bars 4, are a number of transverse rock shafts 14 which are positioned directly beneath the upper edges of the sections 9 as clearly seen in Fig. 1, each of said shafts 14 being provided with a number of longitudinally projecting shaking fingers 15 which overlie the spaces between the upper and lower ends of adjacent sections 9 thereby preventing straw from accumulating therein. For the purpose of rocking the shafts 14, I have provided each of said shafts with an upright operating arm 16 to which a sectional connecting rod 17 is pivoted, said connecting rod extending longitudinally of the machine and being driven by an eccentric 18 which is revolubly mounted upon a driven shaft 19 in the manner disclosed in the drawings. As most clearly seen in Fig. 1, the straw shaking rack or frame is also driven by an eccentric 20, through the instrumentality of a connecting rod 21, this eccentric being driven by a shaft 20' as shown. I intend to drive the two eccentrics 19 and 20 in such a manner as to rotate the former at a considerably greater speed than the latter, thereby rocking the shafts 14 at an extremely high speed thereby causing the fingers 15 to rise and fall at closely spaced intervals for effectually shaking any straw which may have a tendency to lodge beneath the upper edges of the transverse sections 9. For the illustration of one form of driving means for rotating the shaft 19 at a greater rate of speed than the shaft 20' thereby driving the two eccentrics at different speeds, see the illustration at the right hand side of Fig. 2.

By the above set forth construction, it will be seen that I have produced comparatively simple means whereby the efficiency of straw shaking racks or frames, of the character hereinbefore described, may be greatly increased. Particular emphasis is laid upon the fact that by the means before described, the rock shafts 14 and their fingers 15 may be oscillated at a greater speed than that with which the shaking frame reciprocates this being an extremely important feature of the invention.

Having thus described my invention what I claim as new and desire to secure by Letters-Patent is:—

1. The combination with a straw shaking rack including a pair of longitudinal side bars, longitudinal series of triangular side walls rising therefrom and having their hypotenuses inclined in one direction, transverse slats having their ends secured to said hypotenuses, and a frame in which said rack is mounted to reciprocate, of a number of transverse rock shafts having their ends journaled on the frame, said shafts being located in the angles between the altitudes and hypotenuses of adjacent side walls, rigid shaker fingers projecting longitudinally from said rock shafts and overlying certain of said slats, means for reciprocating said rack a predetermined number of strokes in a given time, and other means for oscillating said rock shafts a greater number of times in said given time.

2. The combination with a straw shaking rack including a pair of longitudinal side bars, longitudinal series of triangular side walls rising therefrom and having their hypotenuses inclined in one direction, transverse slats having their ends secured to said hypotenuses, and a frame in which said rack is mounted to reciprocate, of a number of transverse rock shafts located in the angles between and spaced from the altitudes and hypotenuses of adjacent side walls, the opposite ends of said rock shafts being journaled on said frame, operating arms rising from said rock shafts, a longitudinal link pivotally connected to said operating arms, means for reciprocating said rack a predetermined number of strokes in a given time, and other means for reciprocating said rod at a speed greater than that at which the rack reciprocates.

In testimony whereof I have hereunto set my hand in presence of two subscribing witnesses.

JOHN ZIEBER.

Witnesses:
H. E. BEESE,
L. V. McDONALD.